(12) United States Patent
Chen et al.

(10) Patent No.: US 12,367,302 B2
(45) Date of Patent: Jul. 22, 2025

(54) DOCUMENT PERMISSION PROCESSING METHOD AND APPARATUS, ELECTRONIC DEVICE, AND STORAGE MEDIUM

(71) Applicant: Beijing Zitiao Network Technology Co., Ltd., Beijing (CN)

(72) Inventors: Yingyuan Chen, Beijing (CN); Yanzhe Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/345,436

(22) Filed: Jun. 30, 2023

(65) Prior Publication Data

US 2023/0351032 A1 Nov. 2, 2023

Related U.S. Application Data

(63) Continuation of application No. PCT/CN2021/142798, filed on Dec. 30, 2021.

(30) Foreign Application Priority Data

Dec. 31, 2020 (CN) .......................... 202011634006.6

(51) Int. Cl.
*G06F 21/62* (2013.01)
*G06F 9/451* (2018.01)

(52) U.S. Cl.
CPC .......... *G06F 21/6209* (2013.01); *G06F 9/452* (2018.02)

(58) Field of Classification Search
CPC .............................. G06F 21/6209; G06F 9/452
See application file for complete search history.

(56) References Cited

U.S. PATENT DOCUMENTS 6,816,904 B1 * 11/2004 Ludwig .................. H04L 51/10
709/204
2003/0018725 A1 * 1/2003 Turner .................... H04L 67/08
709/228

(Continued)

FOREIGN PATENT DOCUMENTS

CN 110826103 A * 2/2020 ........... G06F 21/604
CN 110865983 A 3/2020
(Continued)

OTHER PUBLICATIONS

International Search Report issued Feb. 28, 2022 in International Application No. PCT/CN2021/142798, with English translation (4 pages).

(Continued)

*Primary Examiner* — Vance M Little

(57) ABSTRACT

Provided are a document permission processing method and apparatus, an electronic device, and a storage medium. The method includes in response to a first permission application operation of a first user on a first target document, sending a first permission request to a second user, wherein the first user has a first permission for the first target document, the second user has a second permission for the first target document, and the first permission request carries an identifier of a third user; and in response to a first feedback instruction of the second user for the first permission request, granting a fourth permission to the third user.

18 Claims, 8 Drawing Sheets

---

In response to a first permission application operation of a first user on a first target document, send a first permission request to a second user, where the first user has a first permission for the first target document, the second user has a second permission for the first target document, the first permission request carries an identifier of a third user, and the third user has a third permission for the first target document — S101

In response to a first feedback instruction of the second user for the first permission request, change the third permission of the third user to the fourth permission — S102

(56) References Cited

U.S. PATENT DOCUMENTS

| | | | | |
|---|---|---|---|---|
| 2013/0297559 A1* | 11/2013 | Bailor | ............... | G06F 21/6227 |
| | | | | 707/608 |
| 2017/0353466 A1* | 12/2017 | Weaver | ............... | H04L 63/101 |
| 2019/0121875 A1* | 4/2019 | Niu | ............... | H04L 65/403 |
| 2022/0201049 A1* | 6/2022 | Jamison | ............... | H04L 65/403 |

FOREIGN PATENT DOCUMENTS

| | | | | | |
|---|---|---|---|---|---|
| CN | 111177734 A | | 5/2020 | | |
| CN | 111339557 A | | 6/2020 | | |
| CN | 111767563 A | | 10/2020 | | |
| CN | 112784295 A | | 5/2021 | | |
| JP | 2008546114 A | | 12/2008 | | |
| JP | 2009205318 A | * | 9/2009 | | |
| JP | 2011-526032 A | | 9/2011 | | |
| JP | 2017-211777 A | | 11/2017 | | |
| JP | 2018142875 A | * | 9/2018 | ......... | H04N 1/32144 |

OTHER PUBLICATIONS

First Office Action issued Jan. 18, 2023 in Chinese Application No. 202011634006.6, with English translation (15 pages).
Second Office Action issued Apr. 20, 2023 in Chinese Application No. 202011634006.6, with English translation (7 pages).
Office action received from Japanese patent application No. 2023-539961 mailed on Jul. 2, 2024, 18 pages (9 pages English Translation and 9 pages Original Copy).
Notice of Reasons for Refusal for Japanese Patent Application No. 2023-539961 dated Dec. 17, 2024, 21 pages.
Written Opinion for International Application No. PCT/CN2021/142798, mailed Feb. 28, 2022, 09 Pages.

* cited by examiner

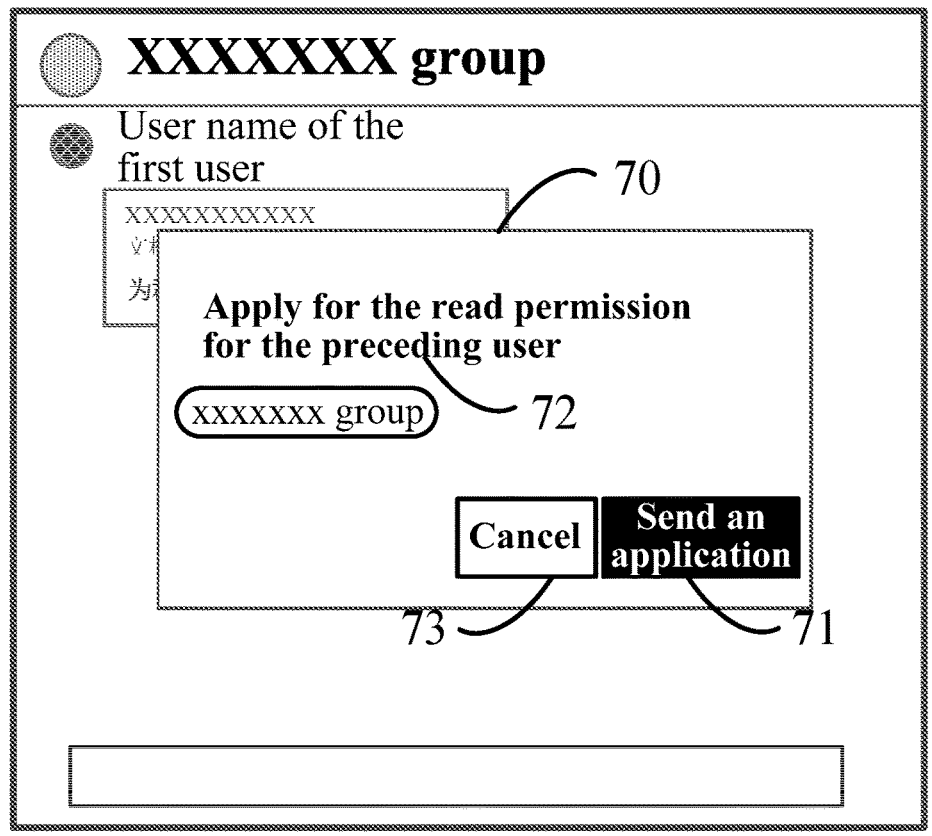

FIG. 7

| In response to a second permission application operation of a first user on a first target document, send a third permission request to a second user, where the first user has a first permission for the first target document, the second user has a second permission for the first target document, and the first target document is provided with a first document permission | S301 |
|---|---|
| In response to a third feedback instruction of the second user for the third permission request, change the first document permission of the first target document to a second document permission | S302 |

FIG. 8

DOCUMENT PERMISSION PROCESSING METHOD AND APPARATUS, ELECTRONIC DEVICE, AND STORAGE MEDIUM

CROSS-REFERENCES TO RELATED APPLICATIONS

This is a continuation application of International Patent Application No. PCT/CN2021/142798, filed on Dec. 30, 2021, which is based on and claims priority to Chinese Patent Application No. 202011634006.6 filed with the China National Intellectual Property Administration (CNIPA) on Dec. 31, 2020, the disclosure of which is incorporated herein by reference in its entirety.

TECHNICAL FIELD

Embodiments of the present disclosure relate to the field of computer technology, for example, a document permission processing method and apparatus, an electronic device, and a storage medium.

BACKGROUND

Currently, a user may edit or read an online document through an online document management product, and the user may view the online document shared by other users or share the online documents to other users. For example, a document owner may set up a document collaborator for the online document and grant the document collaborator permission to read, edit, and/or share the online document. Therefore, the document collaborator can read, edit, and/or share the online document.

However, in the related art, the document collaborator can share the online document only when the document collaborator has the document sharing permission, and when the document collaborator does not have the sharing permission for the online document, the document collaborator cannot share the online document with other users for reading or editing.

SUMMARY

Embodiments of the present disclosure provide a document permission processing method and apparatus, an electronic device, and a storage medium to achieve sharing of an online document by a user without a sharing permission.

In the first aspect, an embodiment of the present disclosure provides a document permission processing method. The method includes the steps described below.

In response to a first permission application operation of a first user on a first target document, a first permission request is sent to a second user, where the first user has a first permission for the first target document, the second user has a second permission for the first target document, and the first permission request carries an identifier of a third user.

In response to a first feedback instruction of the second user for the first permission request, a fourth permission is granted to the third user.

In the second aspect, an embodiment of the present disclosure further provides a document permission processing method. The method includes the steps described below.

In response to a second permission application operation of a first user on a first target document, a third permission request is sent to a second user, where the first user has a first permission for the first target document, the second user has a second permission for the first target document, and the first target document is provided with a first document permission.

In response to a third feedback instruction of the second user for the third permission request, the first document permission of the first target document is changed to a second document permission.

In the third aspect, an embodiment of the present disclosure further provides a document permission processing apparatus. The apparatus includes a first request sending module and a first user permission changing module.

The first request sending module is configured to, in response to a first permission application operation of a first user on a first target document, send a first permission request to a second user, where the first user has a first permission for the first target document, the second user has a second permission for the first target document, and the first permission request carries an identifier of a third user.

The first user permission changing module is configured to, in response to a first feedback instruction of the second user for the first permission request, grant a fourth permission to the third user.

In the fourth aspect, an embodiment of the present disclosure further provides a document permission processing apparatus. The apparatus includes a second request sending module and a document permission changing module.

The second request sending module is configured to, in response to a second permission application operation of a first user on a first target document, send a third permission request to a second user, where the first user has a first permission for the first target document, the second user has a second permission for the first target document, and the first target document is provided with a first document permission.

The document permission changing module is configured to, in response to a third feedback instruction of the second user for the third permission request, change the first document permission of the first target document to a second document permission.

In the fifth aspect, an embodiment of the present disclosure further provides an electronic device.

The electronic device includes one or more processors and a memory configured to store one or more programs.

When executed by the one or more processors, the one or more programs cause the one or more processors to perform the document permission processing method according to the embodiments of the present disclosure.

In the sixth aspect, an embodiment of the present disclosure further provides a computer-readable storage medium configured to store a computer program for performing the document permission processing method according to the embodiments of the present disclosure when the program is executed by a processor.

BRIEF DESCRIPTION OF DRAWINGS

The same or similar reference numerals throughout the drawings denote the same or similar elements. It is to be understood that the drawings are illustrative and that originals and elements are not necessarily drawn to scale.

FIG. 7 is a schematic diagram of a second permission application window according to an embodiment of the present disclosure;

FIG. 8 is a flowchart of a third document permission processing method according to an embodiment of the present disclosure;

DETAILED DESCRIPTION

Figure 1:
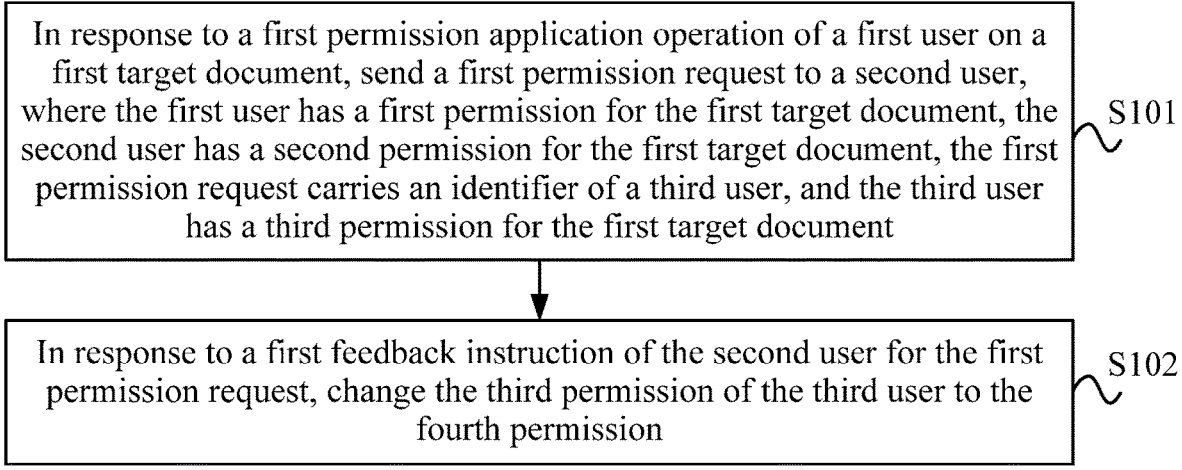
FIG. 1 is a flowchart of a document permission processing method according to an embodiment of the present disclosure.

Embodiments of the present disclosure are described in more detail hereinafter with reference to the drawings. Although some embodiments of the present disclosure are shown in the drawings, it is to be understood that the present disclosure may be implemented in various forms and should not be construed as limited to the embodiments set forth herein; conversely, these embodiments are provided so that the present disclosure is thoroughly and completely understood. It is to be understood that drawings and embodiments of the present disclosure are merely illustrative and are not intended to limit the scope of the present disclosure.

It is to be understood that steps described in method embodiments of the present disclosure may be performed in a different order and/or in parallel. Additionally, the method embodiments may include an additional step and/or omit execution of an illustrated step. The scope of the present disclosure is not limited in this respect.

As used herein, the term "include" and variations thereof are intended to be inclusive, that is, "including, but not limited to". The term "based on" is "at least partially based on". The term "an embodiment" means "at least one embodiment". The term "another embodiment" means "at least one another embodiment". The term "some embodiments" means "at least some embodiments". Related definitions of other terms are given in the description hereinafter.

It is to be noted that concepts such as "first" and "second" in the present disclosure are merely intended to distinguish one from another apparatus, module, or unit and are not intended to limit the order or interrelationship of the functions implemented by the apparatus, module, or unit.

It is to be noted that "one" or "multiple" in the present disclosure is illustrative and non-limiting and that those skilled in the art should understand that "one" or "multiple" is interpreted as "one or more" unless otherwise specified in the context.

The names of messages or information exchanged between apparatuses in embodiments of the present disclosure are illustrative and not to limit the scope of the messages or information.

FIG. 1 is a flowchart of a document permission processing method according to an embodiment of the present disclosure. The method may be performed by a document permission processing apparatus which may be implemented by software and/or hardware and may be configured in an electronic device. For example, the apparatus may be configured in a mobile phone, a tablet computer, a computer device, or a server. The document permission processing method provided in the embodiment of the present disclosure is applicable to a scenario where a document is shared, for example, a scenario where a user without a sharing permission shares an online document with other users. As shown in FIG. 1, the document permission processing method provided in this embodiment may include the steps described below.

In S101, in response to a first permission application operation of a first user on a first target document, a first permission request is sent to a second user, where the first user has a first permission for the first target document, the second user has a second permission for the first target document, the first permission request carries an identifier of a third user, and the third user has a third permission for the first target document.

The first target document may be the online document. The first permission may be an access permission, such as a read permission or an edit permission; the second permission may be a permission that grants a certain permission to other users; the third permission may be a permission lower than the first permission, the permission level of the second permission may be higher than the permission level of the first permission, and the permission level of the first permission may be higher than the permission level of the third permission. In the case where the first permission is the access permission, the first user may be a user having permission to access the first target document, such as a collaborator of the first target document; the second user may be a user having permission to grant other users access to the first target document, such as the owner of the first target document or another user with the second permission; and the third user may be a user without the access permission to the first target document. The first permission application operation may be understood as an operation in which the first user applies for permission for the first target document to the second user for the third user, such as an operation in which a permission application control for the first target document is clicked. The first permission request may be a request in which the first user applies for the access permission to the first target document for one or more third users, and the first permission request carries the identifier of the third user, such as a user name of the third user and may also carry at least one of an identifier of the first user (such as a user name of the first user), a permission applied by the first user for the third user (such as the read permission or the edit permission), or an identifier of the first target document (such as a document name of the first target document) so that the second user can clarify the information related to the request after receiving the first permission request. When the first user intends to apply for permission for the first target document for the third user, the first user may perform the first permission application operation. Accordingly, when detecting the first permission application operation of the first user on the first target document, the electronic device at the first user side sends the first permission request to the second user in response to the first permission application operation.

In this embodiment, the manner for sending the first permission request to the second user may be flexibly configured. For example, the first permission request may be sent to the second user through the email, the website/application software to which the first target document belongs, or an instant messaging client. For example, to facilitate checking and processing the first permission request by the second user, a first permission request may be sent to the second user through the instant messaging client. In this case, the step of sending the first permission request to the second user includes sending a first instant messaging message corresponding to the first permission request to the second user through a first instant messaging client associated with the first target document. For example, the website/application software to which the first target document belongs may send control information carrying the first permission request to the first instant messaging client associated with the first target document, and the first instant messaging client associated with the first target document is controlled through the control information to send the first instant messaging message corresponding to the first permission request to an instant messaging client corresponding to the second user so that the second user can process the received first permission request by checking and processing the first instant messaging message on the instant messaging client of the second user. The first instant messaging client may be the instant messaging client associated with the first target document.

In an embodiment, the document permission processing method provided in this embodiment further includes in response to a first collaboration request in which the first user adds the third user for the first target document, if permission information of the first user does not satisfy a first preset condition, displaying a permission application control for the first user to execute the first permission application operation.

In the preceding embodiment, the first permission application operation may be an operation that triggers the permission application control, and the permission application control may be displayed when a certain user adds another user for a certain document and the user does not have the permission to add other users so that the user applies to a user having permission to add other users for the document to add another user as a user with a fourth permission for the document, that is, to request another user to be granted the fourth permission for the document, such as the access permission. The first collaboration request may be understood as a request to change the third user without certain permission to a user with the permission (such as the read permission or the access permission), that is, a request to grant the certain permission to the third user. The first preset condition may be understood as a condition for granting the third user the requested permission, such as the permission to grant the third user the permission requested by the first user.

For example, when the first user intends to grant the third user the fourth permission, for example, when the first user intends to add the third user as the collaborator of the first target document, the corresponding addition operation may be performed; when detecting the addition operation of the first user, the electronic device at the first user side determines that the first collaboration request is received and in response to the first collaboration request, determines whether the permission information of the first user satisfies the first preset condition. For example, whether the first user has the permission to grant the third user the fourth permission is determined, and in the case where it is determined that the permission information of the first user does not satisfy the first preset condition, the permission application control is displayed.

Accordingly, if the permission information of the first user satisfies the first preset condition, the third user may be added to the first target document, and when a confirmation addition operation of the first user is detected, for example, when it is detected that the first user clicks on a confirmation addition control, the permission of the third user is changed from the third permission to the fourth permission.

In S102, in response to a first feedback instruction of the second user for the first permission request, the third permission of the third user is changed to the fourth permission.

The fourth permission may be the permission requested by the first user to be granted to the second user. The case where the fourth permission is the access permission is used as an example for description. The first feedback instruction may be understood as an instruction for indicating that the fourth permission is granted to the third user, and the first feedback instruction may be generated and fed back when the second user agrees to the content requested by the first permission request.

When the electronic device at the second user side detects that the second user agrees to a trigger operation of the first permission request, the electronic device at the second user side generates the first feedback instruction and sends the first feedback instruction to the electronic device at the first user side. Accordingly, when the electronic device at the first user side receives the first feedback instruction, the electronic device at the first user side may change the third permission of the third user to the fourth permission in response to the first feedback instruction, that is, grant the third user the fourth permission for the first target document.

It is to be noted that although the case where the electronic device at the first user side performs the document permission processing method provided in this embodiment is used as an example for the description of this embodiment, the document permission processing method provided in this embodiment may also be performed by other devices (such as the server). This embodiment does not limit the execution subject of the document permission processing method provided in this embodiment.

In an embodiment, the document permission processing method provided in this embodiment may further include in response to a first feedback request sent by a second instant messaging client associated with a second target document, generating a second feedback instruction to change a permission of a fourth user for the second target document, where the first feedback request is generated based on a feedback operation of the first user on a second instant messaging message in the second instant messaging client, the second instant messaging message corresponds to a second permission request for the second target document, and the second permission request carries an identifier of the fourth user.

The second target document may be understood as a document for which the first user has the second permission, for example, a document for which the first user has the permission to grant other users the permission for the document. The feedback operation of the first user on the second instant messaging message may be understood as an operation of the first user agreeing to the second permission request corresponding to the second instant messaging message, for example, an operation of the first user clicking on a consent control corresponding to the second instant messaging message. The second permission request may be understood as a permission request received by the first user and requesting to change permissions of other users. Accordingly, the fourth user is a user requested by the second permission request to change the corresponding permission for the second target document. The second instant messaging client may be an instant messaging client associated with the second target document, and the second instant messaging client and the first instant messaging client may be clients of the same application software or clients of different application software.

In this embodiment, in addition to applying for permissions for other users to the user having the second permission for the first target document for which the first user has the first permission, for the second target document for which the first user has the second permission, when receiving a permission request from another user who has the first permission but not the second permission to apply for permissions for other users, the first user processes the permission request.

Figure 2:
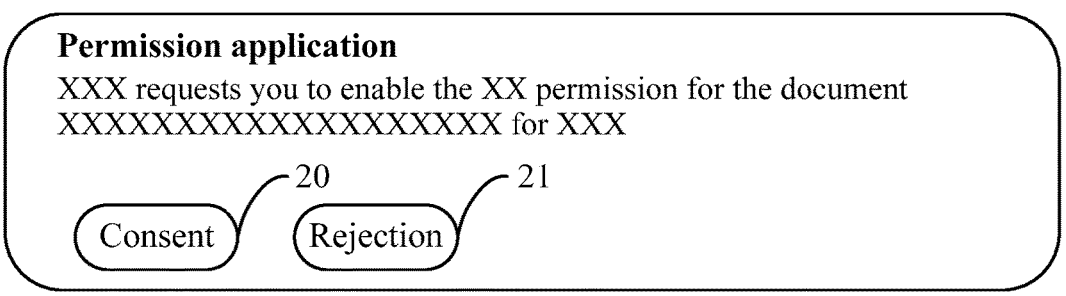
FIG. 2 is a schematic diagram of a second instant messaging message according to an embodiment of the present disclosure.

For example, when another user applies for the permission for the second target document for the fourth user, the instant messaging client associated with the second target document may send the second instant messaging message corresponding to the second permission request to the first user. The second instant messaging client of the first user receives and displays the second instant messaging message and may display a first consent control 20 and a first rejection control 21 corresponding to the second instant messaging message as shown in FIG. 2. The first user may click on the first consent control 20 when agreeing to the second permission request, that is, when agreeing to grant the fourth user the permission requested by the second permission request for the second target document. Accordingly, when the second instant messaging client of the first user detects that the user clicks on the first consent control 20 of the second instant messaging message, the second instant messaging client of the first user determines to receive the feedback operation of the first user on the second instant messaging message, generate the first feedback request, and send the first feedback request to the server or client of the document management software to which the second target document belongs. Thereby, after receiving the first feedback request, the server or client may in response to the first feedback request, generate the second feedback instruction instructing the server or client of the document management software to change the permission of the fourth user for the second target document.

In addition, when the first user does not agree to the second permission request corresponding to the second instant messaging message, the first user may click on the first rejection control 21 corresponding to the second instant messaging message. Accordingly, when the second instant messaging client of the first user detects that the first user clicks on the first rejection control 21, the second instant messaging client of the first user may generate a rejection notification and send the rejection notification to the client of the document management software to which the second target document belongs to notify the user who triggers the generation of the second permission request that the first user rejects the second permission request sent by the user.

In the document permission processing method provided in this embodiment, in response to the first permission application operation of the first user on the first target document, the first permission request carrying the identifier of the third user is sent to the second user, where the first user has the first permission for the first target document, the second user has the second permission for the first target document, and the third user has the third permission for the first target document; and in response to the first feedback instruction of the second user for the first permission request, the third permission of the third user is changed to the fourth permission. In this embodiment, the preceding technical solutions are adopted so that the user with the first permission for the document may apply to the user with the second permission for the document to grant another user a certain permission for the document, the blocking during the document sharing process due to another user without the certain permission can be avoided, and the user experience is improved.

Figure 3:
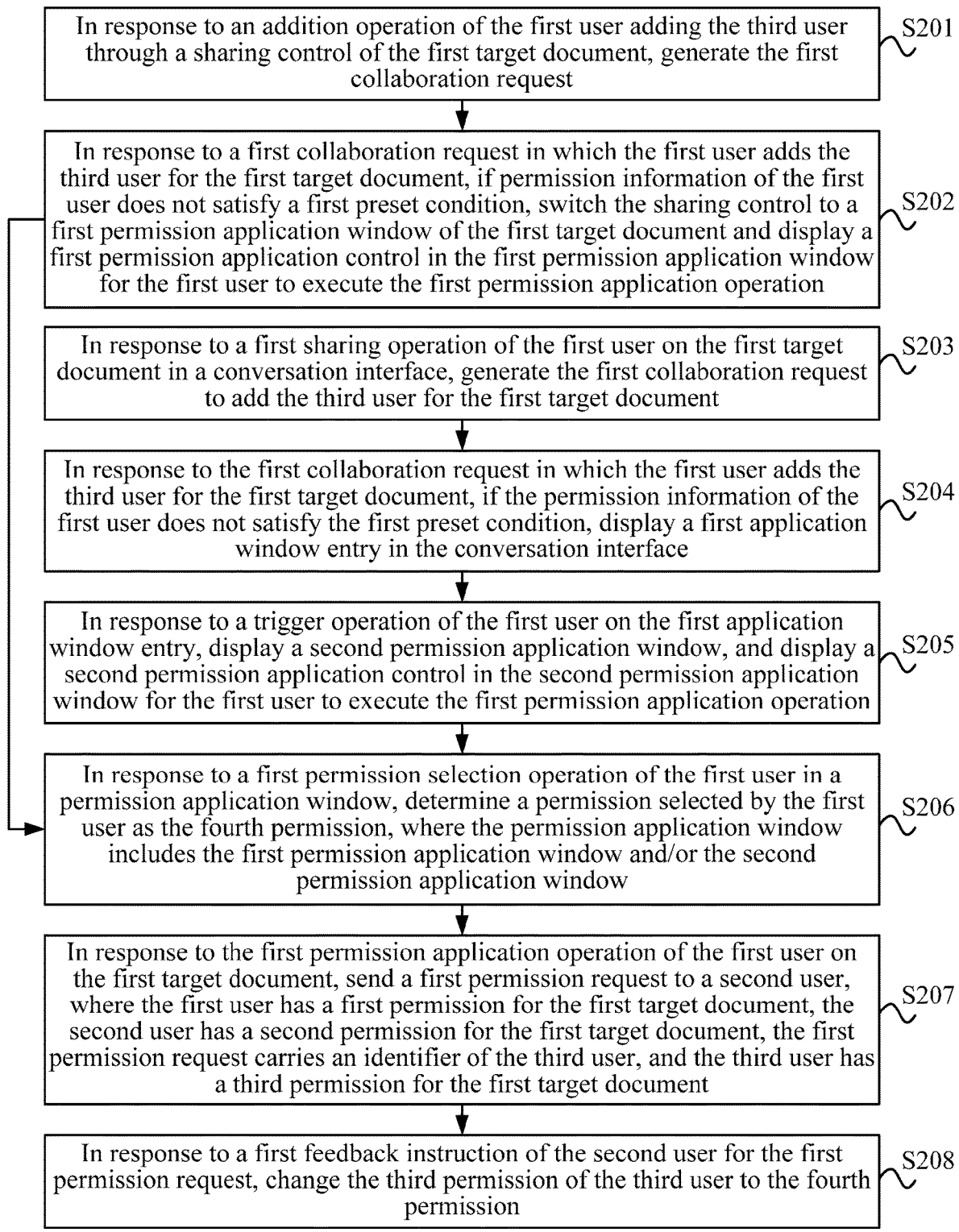
FIG. 3 is a flowchart of another document permission processing method according to an embodiment of the present disclosure.

FIG. 3 is a flowchart of another document permission processing method according to an embodiment of the present disclosure. The solutions in this embodiment may be combined with one or more example solutions in the preceding embodiments. The document permission processing method provided in this embodiment further includes in response to an addition operation of the first user adding the third user through a sharing control of the first target document, generating the first collaboration request; where the step of displaying the permission application control includes switching the sharing control to a first permission application window of the first target document and displaying a first permission application control in the first permission application window.

The document permission processing method provided in this embodiment further includes in response to a first sharing operation of the first user on the first target document in a conversation interface, generating the first collaboration request to add the third user for the first target document; where the step of displaying the permission application control includes displaying a first application window entry in the conversation interface; and in response to a trigger operation of the first user on the first application window entry, displaying a second permission application window and displaying a second permission application control in the second permission application window.

The document permission processing method provided in this embodiment further includes in response to a first permission selection operation of the first user in a permission application window, determining a permission selected by the first user as the fourth permission, where the permission application window includes the first permission application window and/or the second permission application window.

Accordingly, as shown in FIG. 3, the document permission processing method provided in this embodiment may include the steps described below.

In S201, in response to an addition operation of the first user adding the third user through a sharing control of the first target document, the first collaboration request is generated.

The sharing control of the first target document may be understood as a control that adds the third user as a user with a certain permission (such as the fourth permission) for the first target document, such as a window set for the first user to add the third user or another control. The case where the sharing control of the first target document is a sharing window used for adding the third user for the first target document is used as an example for the description below.

In this step, the first user may add the third user as a user with the fourth permission for the first target document through the sharing control of the first target document in the document management software.

Figure 4:
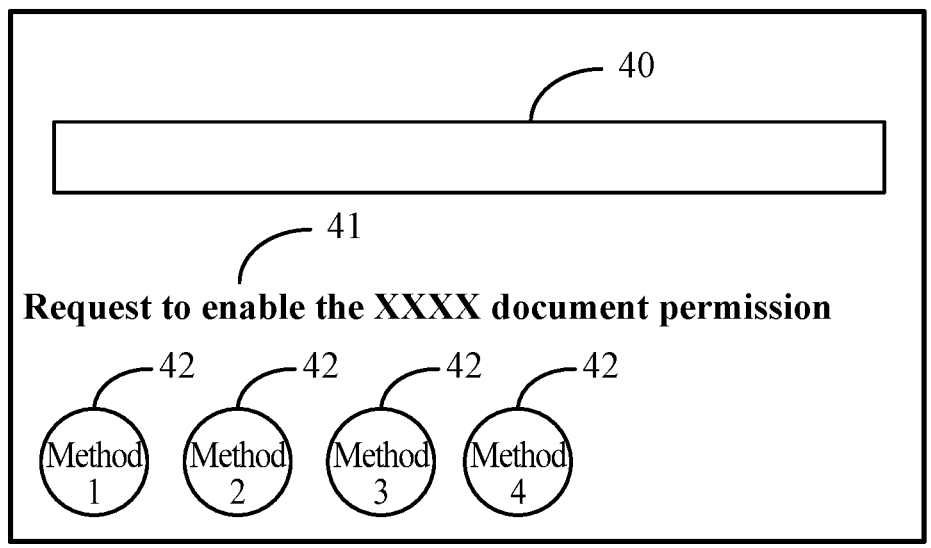
FIG. 4 is a schematic diagram of a sharing control according to an embodiment of the present disclosure.

The case where the fourth permission is the access permission is used as an example. When the first user intends to grant the third user the access permission for the first target document, the first user may control the electronic device to display the sharing window of the first target document in the document management software as shown in FIG. 4. Therefore, the first user may enter the user information of the third user in an input field 40 of the sharing window to instruct the electronic device to search for the third user, and the first user clicks on the user information that is found by the electronic device and matches the user information of the third user entered by the first user, so as to instruct the electronic device to add the user information to the input field 40 of the sharing window as the user information of the third user for whom the first user intends to apply for permission. Accordingly, after detecting that the first user inputs any character in the input field 40 of the sharing window, the electronic device may start searching based on the content inputted by the first user in the input field 40, and when the electronic device detects that the first user clicks on the user information of a certain found user, the electronic device determines that the addition operation of the first user is received, adds the user information clicked by the first user to the input field 40 as the user information of the third user in response to the addition operation, and generates the first collaboration request.

In S202, in response to a first collaboration request in which the first user adds the third user for the first target document, if permission information of the first user does not satisfy a first preset condition, the sharing control is switched to a first permission application window of the first target document and a first permission application control is displayed in the first permission application window and used for the first user to execute the first permission application operation. S206 is performed.

Accordingly, if the permission information of the first user satisfies the first preset condition, the sharing control may be displayed continuously for the first user to continue adding the third user, and after the third user is added, based on a permission changing operation of the first user, the permission of the third user is changed from the third permission to the fourth permission.

Figure 5:
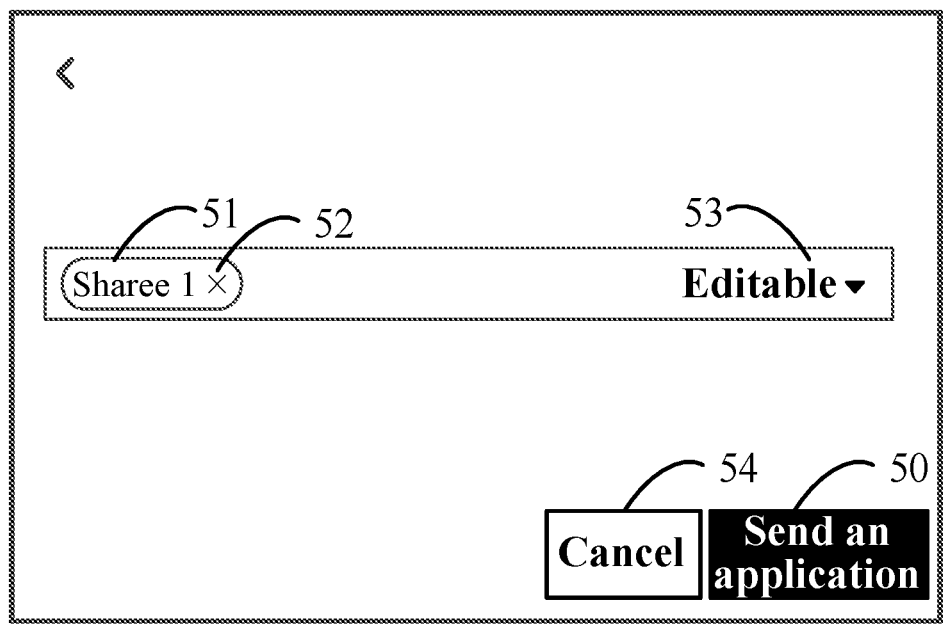
FIG. 5 is a schematic diagram of a first permission application window according to an embodiment of the present disclosure.

For example, after generating the first collaboration request based on the addition operation of the first user, the electronic device may determine whether the first user has the permission to grant other users (including the third user) the fourth permission. When the electronic device determines that the first user does not have the permission to grant other users the fourth permission, the electronic device displays the first permission application window of the first target document and displays a first permission application control 50 in the first permission application window as shown in FIG. 5 so that the first user may send the first permission request to the second user by triggering the first permission application control to request the second user to grant the third user the fourth permission for the first target document. For example, when displaying the first permission application window, the electronic device may automatically add the user information of the third user added by the first user in the input field of the sharing window to the first permission application window, thereby avoiding the case where the user needs to input the user information of the third user again to send a permission request carrying the user information of the third user and simplifying the operation required by the user when applying for permission for a certain document for other users.

In this embodiment, the first user may also modify the user information of the third user added to the first permission application window and thus modify the third user for whom the first user intends to apply for permission for the first target document.

For example, as shown in FIG. 5, in addition to user information 51 of the third user added by the first user, the first permission application window may also display a deletion control 52 corresponding to the user information 51 of each third user added by the first user. Therefore, when the first user intends to delete the user information 51 of a certain third user added to the first permission application window, the first user may click on the deletion control 52 corresponding to the user information 51 of the third user. Accordingly, when the electronic device detects that the first user clicks on the deletion control 52 corresponding to the user information 51 of a certain third user in the first permission application window, the electronic device may delete the user information of the third user from the first permission application window to delete the third user corresponding to the user information 51.

Further, when the first user intends to add the user information of a new third user to the first permission application window, the first user may input the keyword of the user information of the third user to instruct the electronic device to perform searching, and the first user may add the user information of the third user the first user intends to add to the first permission application window of the first target document by clicking on the user information of the third user that is found by the electronic device and the first user intends to add.

In S203, in response to a first sharing operation of the first user on the first target document in a conversation interface, the first collaboration request to add the third user for the first target document is generated.

In S204, in response to the first collaboration request in which the first user adds the third user for the first target document, if the permission information of the first user does not satisfy the first preset condition, a first application window entry is displayed in the conversation interface. The conversation interface may be a chat interface in which the first user shares the document connection of the first target document and may be any conversation window in a live chat client, such as a conversation window where the first user talks to a certain user or a group conversation window where the first user talks to multiple users. The first sharing operation may be understood as an operation in which the first user shares the first target document.

Figure 6:
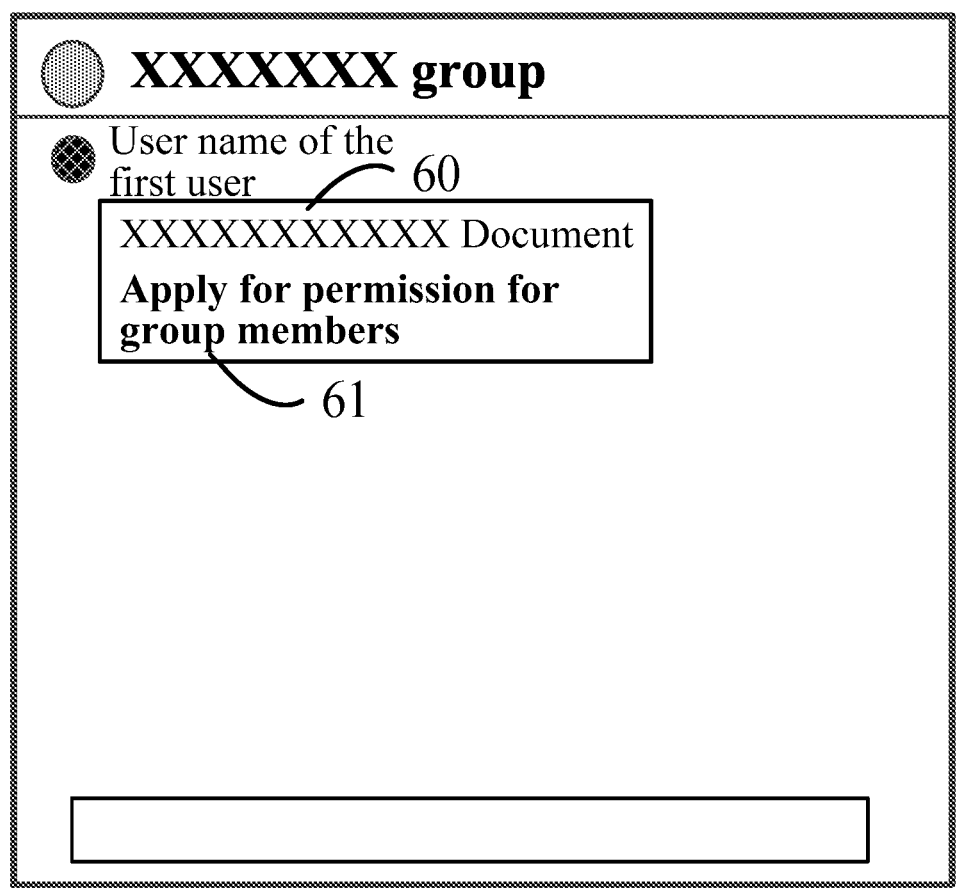
FIG. 6 is a schematic diagram of a conversation interface according to an embodiment of the present disclosure.

The case where the fourth permission is the access permission is used as an example. The first user may share the first target document to other users in the conversation interface of the instant messaging client. Therefore, when the electronic device detects that the first user shares the first target document in a certain conversation interface, the electronic device may generate the first collaboration request and determine whether a user without the permission to access the first target document exists among other users in the conversation window. Based on a determination result that the user without the permission to access the first target document exists among other users in the conversation window, the electronic device may determine the user without the permission to access the first target document in the conversation interface as the third user added by the first user and continue determining whether the permission information of the first user satisfies the first preset condition. For example, whether the first user has the permission to grant the third user the access permission for the first target document is determined. Based on a determination result that the first user has the permission to grant the third user the access permission for the first target document, the access permission for the first target document may be granted to the third user automatically or based on the trigger operation of the first user, that is, the permission of the third user for the first target document is changed to the access permission. Based on a determination result that the first user does not have the permission to grant the third user the access permission for the first target document, in addition to an instant messaging message 60 corresponding to the first target document, the conversation window may also display a first application window entry 61 as shown in FIG. 6 (the case where the conversation interface is the group conversation window is used as an example in FIG. 6) so that the first user triggers the first application window entry 61 to instruct the electronic device to display the second permission application window of the first target document to apply for the access permission for the first target document for the third user in the conversation window.

It is to be understood that the display form of the instant messaging message corresponding to the first target document may be set as required. For example, the instant messaging message corresponding to the first target document may be the document link or document content of the first target document, that is, the electronic device may display the document link to the first target document in a target conversation window. When it is detected that the user clicks on the document link, if the user has the access permission for the first target document, the document content of the first target document is displayed in the target conversation window or the page corresponding to the document link pops up and displays the document content of the first target document; or all or part of the document content of the first target document is displayed directly to the user with the access permission for the first target document in the target conversation window, thereby improving the convenience of the user checking the first target document.

In S205, in response to a trigger operation of the first user on the first application window entry, a second permission application window is displayed, and a second permission application control is displayed in the second permission application window and used for the first user to execute the first permission application operation.

The trigger operation of the first user on the first application window entry may be an operation of the first user clicking on the first application window entry displayed in the conversation interface.

As shown in FIG. 6, the electronic device displays the conversation interface and displays the first application window entry 61 in the conversation interface. When the first user intends to apply for the access permission for the first target document for the user without the access permission for the first target document in the conversation interface, the first user may click on the first application window entry 61 displayed in the conversation interface. When detecting that the user clicks on the first application window entry 61 displayed in the conversation interface, the electronic device determines that the trigger operation of the first user on the first application window entry 61 is received. As shown in FIG. 7, in response to the trigger operation, a second permission application window 70 is displayed, and a second permission application control 71 is displayed in the second permission application window 70. Therefore, the user may click on the second permission application control 71 displayed in the second permission application window 70 to instruct the electronic device to send the second permission request to the second user.

In S206, in response to a first permission selection operation of the first user in a permission application window, a permission selected by the first user is determined as the fourth permission, where the permission application window includes the first permission application window and/or the second permission application window.

For example, as shown in FIGS. 5 and 7, a first permission selection control 53 may be set in the first permission application window and a second permission selection control 72 may be set in the second permission application window 70. Therefore, when the first user intends to set the fourth permission for the first target document for which the first user applies to the second user for the corresponding third user, the first user may click on the first permission selection control 53/second permission selection control 72; when the electronic device detects that the user clicks on the first permission selection control 53/second permission selection control 72, the electronic device may change the permission currently displayed at the position of the first permission selection control 53/second permission selection control 72 and selected by the first user to another permission, for example, change the read permission currently selected by the first user to the edit permission or change the edit permission currently selected by the first user to the access permission, so as to determine the fourth permission; or when the electronic device detects that the user clicks on the first permission selection control 53/second permission selection control 72, a permission list pops up, and the permission selected by the first user from the permission list is determined as the fourth permission.

In S207, in response to the first permission application operation of the first user on the first target document, a first permission request is sent to a second user, where the first user has a first permission for the first target document, the second user has a second permission for the first target document, the first permission request carries an identifier of the third user, and the third user has a third permission for the first target document.

In this embodiment, still referring to FIGS. 5 and 7, in addition to the first permission application control 50, the first permission application window may also display a first cancel control 54 configured to instruct the electronic device to close the first permission application window. In addition to the second permission application control 71, the second permission application window 70 may also display a second cancel control 73 configured to instruct the electronic device to close the second permission application window 70. Therefore, when the first user intends to apply for the fourth permission for the first target document to the second user for the corresponding third user, the first user may trigger the first permission application control 50 in the first permission application window or trigger the second permission application control 71 in the second permission application window 70. Accordingly, when the electronic device detects that the user triggers the first permission application control 50 or the second permission application control 71, the electronic device may determine that the first permission application operation of the first user on the first target document is received and in response to the first permission application operation, send the first permission request to the second user. When the first user intends to instruct the electronic device to close the first permission application window, the first user may click on the first cancel control 54 in the first permission application window. Accordingly, when the electronic device detects that the first user clicks on the first cancel control 54 in the first permission application window, the electronic device may stop displaying the first permission application window. When the first user intends to instruct the electronic device to close the second permission application window 70, the first user may click on the second cancel control 73 in the second permission application window 70. Accordingly, when the electronic device detects that the first user clicks on the second cancel control 73 in the second permission application window 70, the electronic device may stop displaying the second permission application window.

It is to be understood that when the first user adds multiple third users, the electronic device may generate the first permission request including the user information of the multiple third users and send the first permission request to the second user; or the electronic device may generate the first permission request including the user information of the third user for each third user separately and send multiple first permission requests to the second user separately so that the second user may adopt different measures (for example, consent or rejection) as required to process the different received first permission requests.

In S208, in response to a first feedback instruction of the second user for the first permission request, the third permission of the third user is changed to the fourth permission.

In the document permission processing method provided in this embodiment, the user may apply for permission for a certain document for other users, thereby avoiding the case where the user cannot share the online document with the user without the access permission for this document and improving the efficiency of application and authorization in the case of no access permission. FIG. 8 is a flowchart of a document permission processing method according to an embodiment of the present disclosure. The method may be performed by a document permission processing apparatus which may be implemented by software and/or hardware and may be configured in an electronic device. For example, the apparatus may be configured in a mobile phone, a tablet computer, a computer device, or a server. The document permission processing method provided in the embodiment of the present disclosure is applicable to a scenario where a document is shared, for example, a scenario where a user applying for the modification of the document permission to obtain the document can access the online document. As shown in FIG. 8, the document permission processing method provided in this embodiment may include the steps described below.

In S301, in response to a second permission application operation of a first user on a first target document, a third permission request is sent to a second user, where the first user has a first permission for the first target document, the second user has a second permission for the first target document, and the first target document is provided with a first document permission.

The first document permission may be the sharing permission of the first target document, such as the link access permission for the first document, that is, the permission whether to allow a user without the access permission for the first target document to access the first target document through the link to the first target document shared by other users. Accordingly, a second permission application operation may be understood as an operation in which the first user applies to the second user for a certain document permission for opening the document, such as an operation of clicking on a permission application control for applying for the document permission; the third permission request may be a request by the first user to apply for a certain document permission for the first target document, and the third permission request may carry at least one of the identifier of the first user (such as the user name of the first user), the document permission applied by the first user (such as readable by the user who obtains a link in an organization, editable by the user who obtains the link in the organization, readable by the user who obtains a link on the Internet, and/or editable by the user who obtains the link on the Internet), or the identifier of the first target document (such as the document name of the first target document) so that after receiving the third permission request, the second user can clarify the information related to the request.

When the first user intends to apply for the modification of the document permission of the first target document, the first user may perform the second permission application operation. Accordingly, when the electronic device detects the second permission application operation of the first user on the first target document, the electronic device at the first user side sends the third permission request to the second user in response to the second permission application operation. In this embodiment, the manner for sending the third permission request to the second user may be flexibly set. For example, the third permission request may be sent to the second user through the email, the website/application software to which the first target document belongs, or the instant messaging client. For example, to facilitate checking and processing the third permission request by the second user, the third permission request may be sent to the second user through the instant messaging client. In this case, the step of sending the third permission request to the second user includes sending a third instant messaging message corresponding to the third permission request to the second user through a first instant messaging client associated with the first target document. For example, the website/application software to which the first target document belongs may send control information carrying the third permission request to the first instant messaging client associated with the first target document, and the first instant messaging client associated with the first target document is controlled through the control information to send the third instant messaging message corresponding to the third permission request to an instant messaging client corresponding to the second user so that the second user can process the received third permission request by checking and processing the third instant messaging message on the instant messaging client of the second user.

In an embodiment, the document permission processing method provided in this embodiment further includes in response to a control display request of the first user for the first target document, if permission information of the first user does not satisfy a second preset condition, displaying a third permission application control for the first user to execute the second permission application operation.

In the preceding embodiments, the second permission application operation may be an operation of triggering the third permission application control. The third permission application control may be displayed when a certain user changes the document permission of a certain document and the user does not have the permission to change the document permission of the document so that the user can apply to the user with the document permission to change the document for the document permission to change the document, for example, the user can apply for the link access permission for the document. The control display request may be understood as a request to display a permission changing control to change the document permission of the corresponding document. The second preset condition may be understood as a condition for changing the document permission, such as granting the permission to change the document permission of the first target document.

For example, when the first user intends to change the document permission of the first target document, the first user may perform a corresponding trigger operation; when detecting the trigger operation of the first user, the electronic device at the first user side determines that the control display request is received and in response to the control display request, determines whether the permission information of the first user satisfies the second preset condition. For example, whether the first user has the permission to change the document permission of the first target document is determined, and in the case where it is determined that the permission information of the first user does not satisfy the second preset condition, the third permission application control is displayed.

Accordingly, if the permission information of the first user satisfies the second preset condition, the permission changing control, for example, a permission changing window, may be displayed for the first user to change the document permission of the first target document from the first document permission to the second document permission.

In S302, in response to a third feedback instruction of the second user for the third permission request, the first document permission of the first target document is changed to a second document permission.

The second document permission may be the document permission requested by the first user. The case where the second document permission is the link access permission is used as an example for description. The third feedback instruction may be understood as an instruction for indicating that the second document permission of the first target document is enabled, and the third feedback instruction may be generated and fed back when the second user agrees to the content requested by the third permission request.

When the electronic device detects that the second user agrees to a trigger operation of the third permission request, the electronic device at the second user side generates the third feedback instruction and sends the third feedback instruction to the electronic device at the first user side. Accordingly, when the electronic device receives the third feedback instruction, the electronic device at the first user side may in response to the third feedback instruction, change the first document permission of the first target document to the second document permission, that is, enable the second document permission of the first target document.

It is to be noted that although the case where the electronic device at the first user side performs the document permission processing method provided in this embodiment is used as an example for the description of this embodiment, the document permission processing method provided in this embodiment may also be performed by other devices (such as the server). This embodiment does not limit the execution subject of the document permission processing method provided in this embodiment.

In an embodiment, the document permission processing method provided in this embodiment may further include in response to a second feedback request sent by a second instant messaging client associated with a second target document, generating a fourth feedback instruction to change a document permission of the second target document, where the second feedback request is generated based on a feedback operation of the first user on a fourth instant messaging message in the second instant messaging client, and the fourth instant messaging message corresponds to a fourth permission request for the second target document.

The second target document may be understood as a document for which the first user has the second permission, for example, a document for which the first user has the permission to change the document permission. The feedback operation of the first user on the fourth instant messaging message may be understood as an operation of the first user agreeing to the fourth permission request, for example, an operation of the first user clicking on a consent control for the fourth instant messaging message. The fourth permission request may be understood as a permission request received by the first user and requesting to change the document permission of the first target document.

In this embodiment, in addition to requesting the second user to change the document permission of the first target document for the first target document for which the first user has the first permission, for the second target document for which the first user has the second permission, when receiving a permission request sent by another user who has the first permission but not the second permission to change the document permission, the first user processes the permission request.

Figures 9, 10:
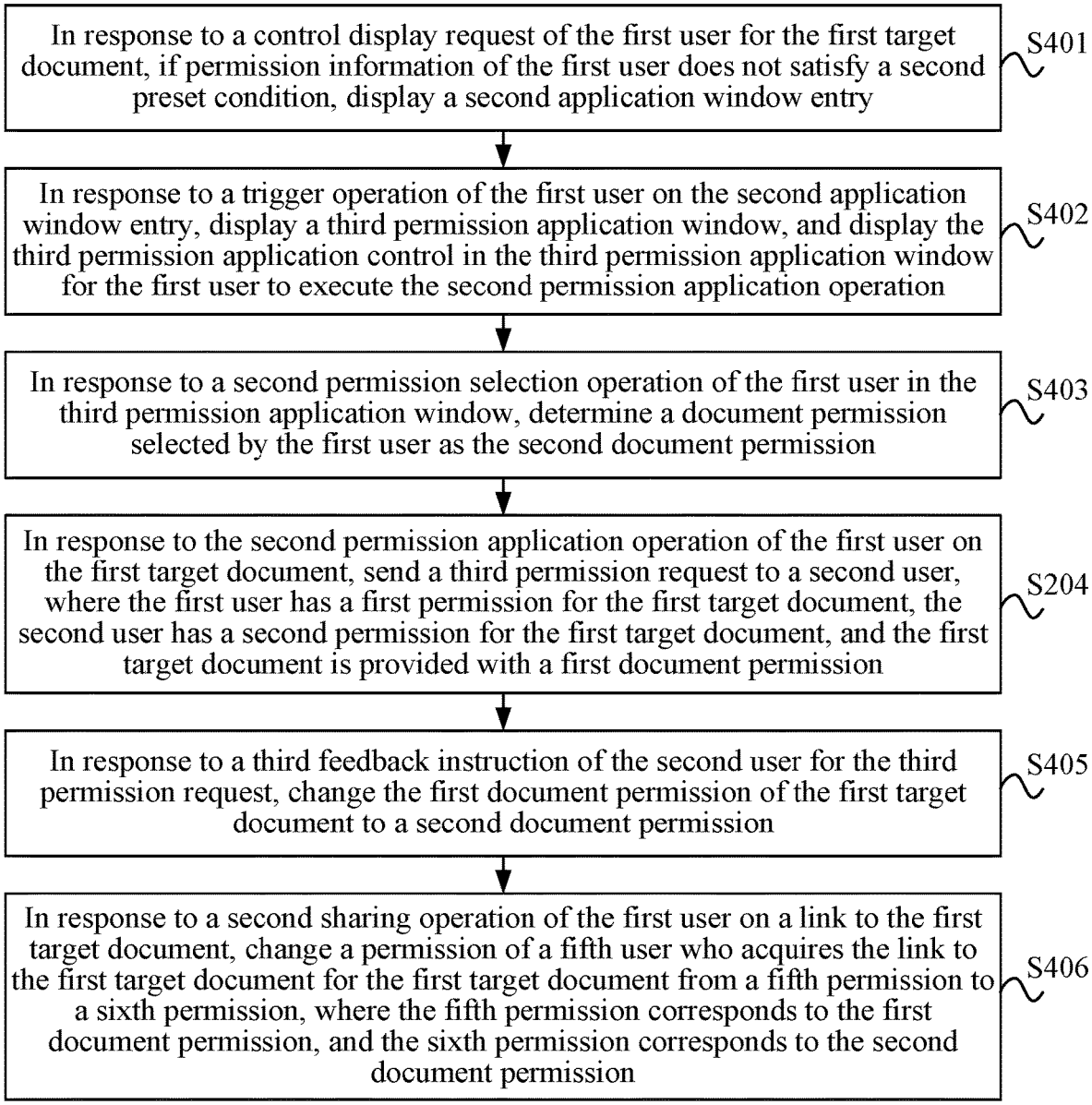
FIG. 9 is a schematic diagram of a fourth instant messaging message according to an embodiment of the present disclosure.
FIG. 10 is a flowchart of a fourth document permission processing method according to an embodiment of the present disclosure.

For example, when another user intends to change the document permission of the second target document, the instant messaging client associated with the second target document may send the fourth instant messaging message corresponding to the fourth permission request to the first user. The second instant messaging client of the first user receives and displays the fourth instant messaging message and may display a second consent control 90 and a second rejection control 91 corresponding to the fourth instant messaging message as shown in FIG. 9. When the first user agrees to the fourth permission request, that is, when the first user agrees to enable the second document permission of the second target document, the first user may click on the second consent control 90. Accordingly, when the second instant messaging client of the first user detects that the user clicks on the second consent control 90 of the second instant messaging message, the second instant messaging client of the first user determines to receive the feedback operation of the first user on the fourth instant messaging message, generates a second feedback request, and sends the second feedback request to the server or client of the document management software to which the second target document belongs. Therefore, after receiving the second feedback request, the server or client may in response to the second feedback request, generate the fourth feedback instruction to instruct the server or client of the document management software through the fourth feedback instruction to change the document permission of the second target document.

In addition, when the first user does not agree to the fourth permission request corresponding to the fourth instant messaging message, the first user may click on the second rejection control 91 corresponding to the fourth instant messaging message. Accordingly, when the second instant messaging client of the first user detects that the first user clicks on the second rejection control 91, the second instant messaging client of the first user may generate a rejection notification and send the rejection notification to the client of the document management software to which the second target document belongs to notify the user who triggers the generation of the fourth permission request that the first user rejects the fourth permission request sent by the user.

In the document permission processing method provided in this embodiment, in response to the second permission application operation of the first user on the first target document, the third permission request is sent to the second user, where the first user has the first permission for the first target document, the second user has the second permission for the first target document, and the first target document is provided with the first document permission; and in response to the third feedback instruction of the second user for the third permission request, the first document permission of the first target document is changed to the second document permission. In this embodiment, the preceding technical solutions are adopted, and the user without permission to change the document permission of the document may apply to the user having permission to change the document permission of the document for a certain document permission of the document so that after the document is shared with other users, the other users can access the document, the blocking during the document sharing or editing process due to the other users without permission to access the document after sharing can be avoided, and the user experience is improved.

FIG. 10 is a flowchart of another document permission processing method according to an embodiment of the present disclosure. The solutions in this embodiment may be combined with one or more example solutions in the preceding embodiments. After the first document permission of the first target document is changed to the second document permission, the method further includes in response to a second sharing operation of the first user on a link to the first target document, changing a permission of a fifth user who acquires the link to the first target document for the first target document from a fifth permission to a sixth permission, where the fifth permission corresponds to the first document permission, and the sixth permission corresponds to the second document permission.

The step of displaying the third permission application control includes displaying a second application window entry; and in response to a trigger operation of the first user on the second application window entry, displaying a third permission application window and displaying the third permission application control in the third permission application window.

The document permission processing method provided in this embodiment further includes in response to a second permission selection operation of the first user in the third permission application window, determining a document permission selected by the first user as the second document permission.

Accordingly, as shown in FIG. 10, the document permission processing method provided in this embodiment may include the steps described below.

In S401, in response to a control display request of the first user for the first target document, if permission information of the first user does not satisfy a second preset condition, a second application window entry is displayed.

Accordingly, if the permission information of the first user satisfies the second preset condition, the permission changing control for the first target document may be displayed for the first user to change the document permission of the first target document.

The control display request may be used for requesting the display of the permission changing control for the first target document and may be generated based on the trigger action of the first user, where the trigger operation may be an operation of triggering the electronic device to display a sharing window or a sharing page corresponding to a certain sharing method. Accordingly, the second application window entry may be understood as the entry to the third permission application window and may be displayed in the sharing window and/or the sharing pages corresponding to multiple sharing methods.

The second document permission is the link access permission. As shown in FIG. 4 (the case where a second application window entry 41 is displayed in the sharing window is used as an example in FIG. 4), when the electronic device detects the trigger operation for displaying the sharing window, the electronic device determines whether the first target document enables the link access permission; based on a determination result that the first target document enables the link access permission, the sharing window is displayed and the second application window entry 41 is not displayed in the sharing window; and based on a determination result that the first target document does not enable the link access permission, whether the permission information of the first user satisfies the second preset condition may be determined continuously. For example, whether the first user has the permission to change the document permission of the first target document is determined; based on a determination result that the first user has the permission to change the document permission of the first target document, the sharing window is displayed and the second application window entry 41 is not displayed in the sharing window; and based on a determination result that the first user does not have the permission to change the document permission of the first target document, the sharing window is displayed, the second application window entry 41 is displayed in the sharing window, and a sharing method control 42 corresponding to each of the multiple sharing methods that can be used when the first target document is shared may be displayed in the sharing window.

Therefore, when the user intends to share the first target document in a certain sharing method, the user may click on the sharing method control 42 corresponding to the sharing method. Accordingly, when the electronic device detects that the first user clicks on a certain sharing method control 42, the electronic device may determine whether the first target document enables the link access permission; based on a determination result that the first target document enables the link access permission, the sharing page corresponding to the sharing method is displayed and the second application window entry 41 is not displayed in the sharing window; and based on a determination result that the first target document does not enable the link access permission, whether the permission information of the first user satisfies the second preset condition may be determined continuously. For example, whether the first user has the permission to change the document permission of the first target document is determined; based on a determination result that the first user has the permission to change the document permission of the first target document, the sharing page corresponding to the sharing method is displayed and the second application window entry 41 is not displayed in the sharing window; and based on a determination result that the first user does not have the permission to change the document permission of the first target document, the sharing page corresponding to the sharing method is displayed and the second application window entry 41 is displayed in the sharing page as shown in FIG. 11 (the case where the second application window entry 41 is displayed in the display page is used as an example in FIG. 11).

In S402, in response to a trigger operation of the first user on the second application window entry, a third permission application window is displayed, and the third permission application control is displayed in the third permission application window and used for the first user to execute the second permission application operation.

The trigger operation of the first user on the second application window entry may be an operation of the first user clicking on the sharing window or the second application window entry displayed in the sharing page.

Figure 11:
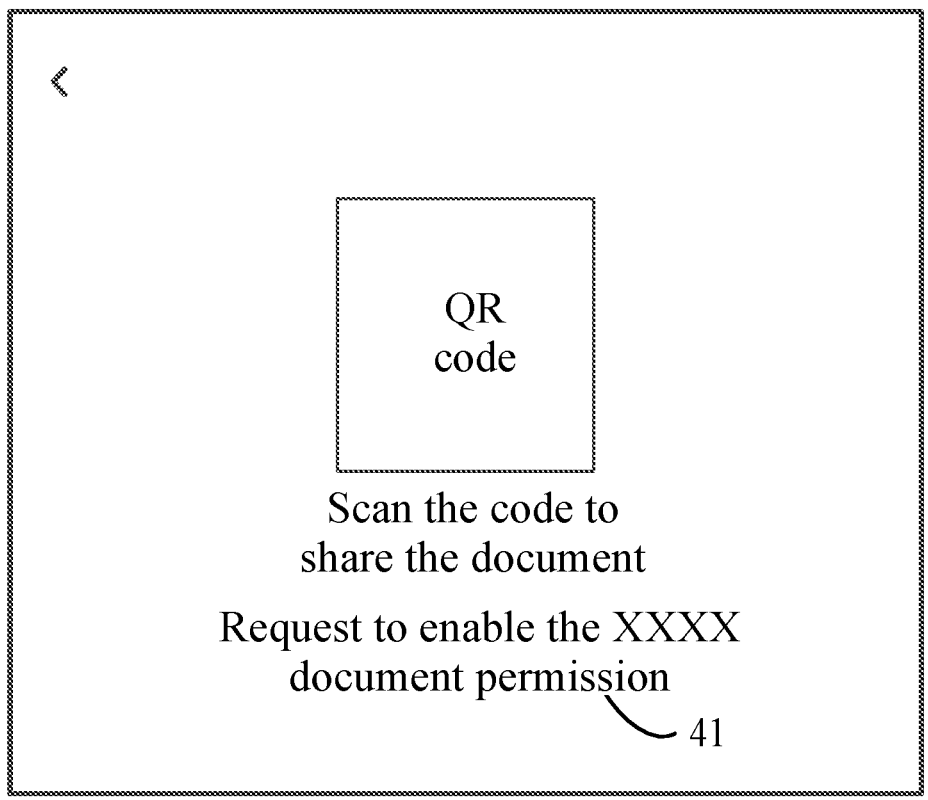
FIG. 11 is a schematic diagram of a sharing page according to an embodiment of the present disclosure.
Figure 12:
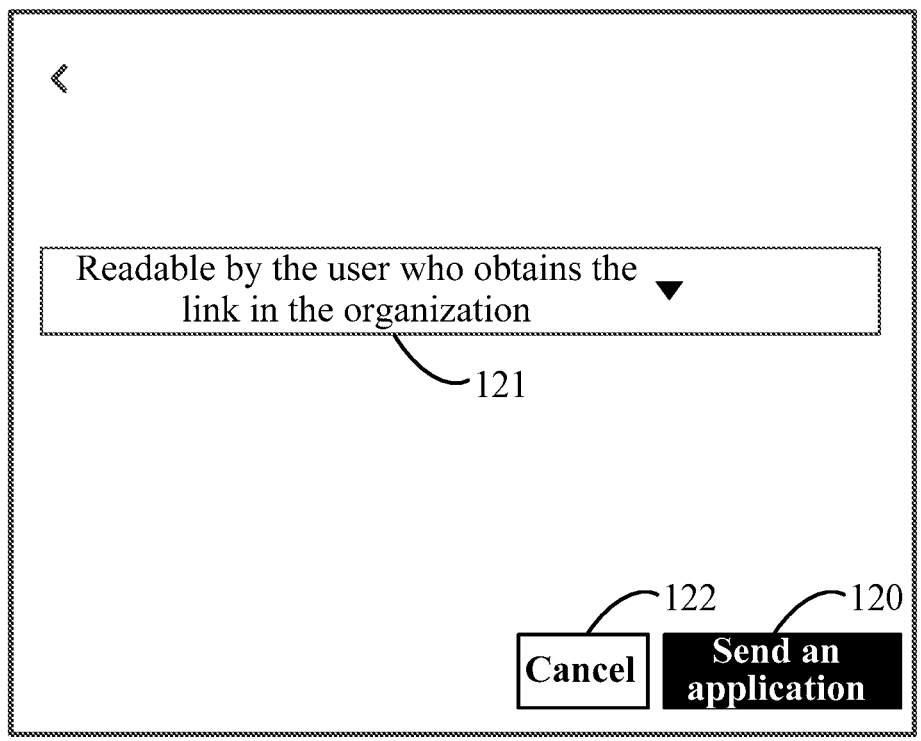
FIG. 12 is a schematic diagram of a third permission application window according to an embodiment of the present disclosure.

As shown in FIGS. 4 and 11, the electronic device displays the second application window entry 41 in the sharing window or sharing page. When the first user requests the second user to change the document permission of the first target document, the first user may click on the second application window entry 41. As shown in FIG. 12, when the electronic device detects that the user clicks on the second application window entry 41, the electronic device determines that the trigger operation of the first user on the second application window entry 41 is received, displays the third permission application window in response to the trigger operation, and displays a third permission application control 120 in the third permission application window. Therefore, the user may click on the second permission application control 120 displayed in the third permission application window to instruct the electronic device to send the third permission request to the second user.

In S403, in response to a second permission selection operation of the first user in the third permission application window, a document permission selected by the first user is determined as the second document permission.

For example, as shown in FIG. 12, a third permission selection control 121 may be set in the second permission application window. Therefore, when the first user intends to set the second document permission of the first target document that the first user requests the second user to enable, the first user may click on the third permission selection control 121. When the electronic device detects that the user clicks on the third permission selection control 121, the electronic device may change the document permission that is selected by the first user and currently displayed at the position of the third permission selection control 121 to another document permission, for example, change the document permission currently selected by the first user from readable by the user who obtains the link in the organization to editable by the user who obtains the link in the organization, readable by the user who obtains the link on the Internet, or editable by the user who obtains the link on the Internet, so as to determine the second document permission. Alternatively, when it is detected that the user clicks on the third permission selection control 121, a document permission list pops up, and the document permission selected by the first user from the document permission list is determined as the fourth permission.

In S404, in response to the second permission application operation of the first user on the first target document, a third permission request is sent to a second user, where the first user has a first permission for the first target document, the second user has a second permission for the first target document, and the first target document is provided with a first document permission.

In this embodiment, still referring to FIG. 12, in addition to the third permission application control 120, the second permission application window may also display a third cancel control 122 configured to instruct the electronic device to close the third permission application window. Therefore, when the first user intends to request the second user to enable the second document permission of the first target document, the first user may trigger the third permission application control 120 in the third permission application window. Accordingly, when the electronic device detects that the user triggers the third permission application control 120, the electronic device may determine that the second permission application operation of the first user on the first target document is received and in response to the second permission application operation, send the third permission request to the second user. When the first user intends to instruct the electronic device to close the third permission application window, the first user may click on the third cancel control 122 in the third permission application window. Accordingly, when detecting that the first user clicks on the third cancel control 122 in the third permission application window, the electronic device may stop displaying the third permission application window.

In S405, in response to a third feedback instruction of the second user for the third permission request, the first document permission of the first target document is changed to a second document permission.

In S406, in response to a second sharing operation of the first user on a link to the first target document, a permission of a fifth user who acquires the link to the first target document for the first target document is changed from a fifth permission to a sixth permission, where the fifth permission corresponds to the first document permission, and the sixth permission corresponds to the second document permission.

The second sharing operation may be an operation of sharing the link to the first target document. The second document permission of the first target document may include access permission content, such as the read permission or edit permission and may also include the range of users, such as the user who obtain the link in the organization or the user who obtains the link on the Internet so that the second user can selectively grant some users permission to access the first target document via links as required.

For example, the second document permission is the link access permission, and the link access permission includes the access permission content and the range of users. After the document permission of the first target document is changed to the link access permission, when the operation of sharing the link to the first target document is detected, whether the user who obtains the link is the fifth user without the access permission for the first target document may be determined, and when it is determined that the user who obtains the link is the fifth user without the access permission for the first target document, whether the fifth user is a user within the range of users corresponding to the link access permission set for the first target document may be determined. For example, when the link access permission set for the first target document is readable by the user who obtains the link in the organization or editable by the user who obtains the link in the organization, whether the fifth user is a user in the organization to which the first user belongs (such as the company or institution to which the first user belongs) may be determined. Based on a determination result that the fifth user is a user in the organization to which the first user belongs, the fifth permission of the fifth user is changed to the sixth permission corresponding to the access permission content of the link access permission set for the first target document. For example, in the case where the access permission content of the link access permission set for the first target document is the read permission, the fifth user is granted the read permission for the first target document; and in the case where the access permission content of the link access permission set for the first target document is the edit permission, the fifth user is granted the edit permission for the first target document. Based on a determination result that the fifth user is not a user in the organization to which the first user belongs, the permission of the fifth user for the first target document may not be changed.

In the document permission processing method provided in this embodiment, the user may apply for the link access permission for the first target document, and after another user without the access permission for the first target document obtains the link, this user is granted the access permission for the first target document so that the user who obtains the link to the first target document can access the first target document, the case where that the user who obtains the link does not have the permission to access the first target document via the link after the user shares the link to the first target document can be avoided, the case where multiple users who need to obtain the link apply for permission separately can be avoided, and the user experience can be improved.

Figure 13:
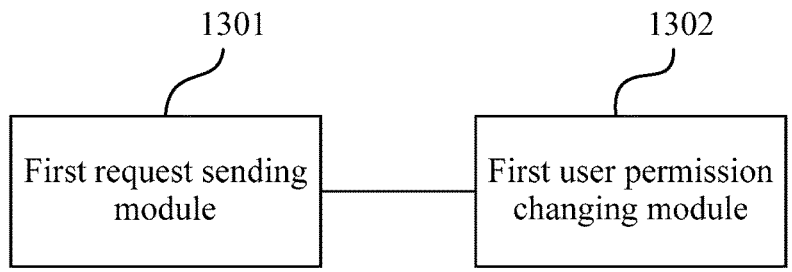
FIG. 13 is a block diagram of a document permission processing apparatus according to an embodiment of the present disclosure.

FIG. 13 is a block diagram of a document permission processing apparatus according to an embodiment of the present disclosure. The apparatus may be implemented by software and/or hardware and may be configured in an electronic device. For example, the apparatus may be configured in a mobile phone, a tablet computer, a computer device, or a server and may process the permission of the user for a document by performing the document permission processing method. As shown in FIG. 13, the document permission processing apparatus provided in this embodiment may include a first request sending module 1301 and a first user permission changing module 1302.

The first request sending module 1301 is configured to, in response to a first permission application operation of a first user on a first target document, send a first permission request to a second user, where the first user has a first permission for the first target document, the second user has a second permission for the first target document, the first permission request carries an identifier of a third user, and the third user has a third permission for the first target document.

The first user permission changing module 1302 is configured to, in response to a first feedback instruction of the second user for the first permission request, change the third permission of the third user to a fourth permission.

In the document permission processing apparatus provided in this embodiment, the first request sending module is configured to, in response to the first permission application operation of the first user on the first target document, send the first permission request carrying the identifier of the third user to the second user, where the first user has the first permission for the first target document, the second user has the second permission for the first target document, and the third user has the third permission for the first target document; and the first user permission changing module is configured to, in response to the first feedback instruction of the second user for the first permission request, change the third permission of the third user to the fourth permission. In this embodiment, the preceding technical solutions are adopted so that the user with the first permission for the document may apply to the user with the second permission for the document to grant another user a certain permission for the document, the blocking during the document sharing process due to another user without the certain permission can be avoided, and the user experience is improved.

The document permission processing apparatus provided in this embodiment further includes a first control display module configured to, in response to a first collaboration request in which the first user adds the third user for the first target document, if permission information of the first user does not satisfy a first preset condition, display a permission application control for the first user to execute the first permission application operation.

The document permission processing apparatus provided in this embodiment further includes a first request module configured to, in response to an addition operation of the first user adding the third user through a sharing control of the first target document, generate the first collaboration request. The first control display module is configured to, in response to the first collaboration request in which the first user adds the third user for the first target document, if the permission information of the first user does not satisfy the first preset condition, switch the sharing control to a first permission application window of the first target document and display a first permission application control in the first permission application window.

The document permission processing apparatus provided in this embodiment further includes a second request module configured to, in response to a first sharing operation of the first user on the first target document in a conversation interface, generate the first collaboration request to add the third user for the first target document. The first control display module is configured to, in response to the first collaboration request in which the first user adds the third user for the first target document, if the permission information of the first user does not satisfy the first preset condition, display a first application window entry in the conversation interface and in response to a trigger operation of the first user on the first application window entry, display a second permission application window and display a second permission application control in the second permission application window.

The document permission processing apparatus provided in this embodiment further includes a first permission determination module configured to, in response to a first permission selection operation of the first user in a permission application window, determine a permission selected by the first user as the fourth permission, where the permission application window includes the first permission application window and/or the second permission application window.

The first request sending module 1301 is configured to, in response to the first permission application operation of the first user on the first target document, send a first instant messaging message corresponding to the first permission request to the second user through a first instant messaging client associated with the first target document.

The document permission processing apparatus provided in this embodiment further includes a first feedback module configured to, in response to a first feedback request sent by a second instant messaging client associated with a second target document, generate a second feedback instruction to change a permission of a fourth user for the second target document, where the first feedback request is generated based on a feedback operation of the first user on a second instant messaging message in the second instant messaging client, the second instant messaging message corresponds to a second permission request for the second target document, and the second permission request carries an identifier of the fourth user.

The document permission processing apparatus provided in the embodiment of the present disclosure can perform the document permission processing method provided in any embodiment of the present disclosure and has functional modules and beneficial effects corresponding to the executed document permission processing method. For technical details not described in detail in this embodiment, reference may be made to the document permission processing method provided in any embodiment of the present disclosure.

Figure 14:
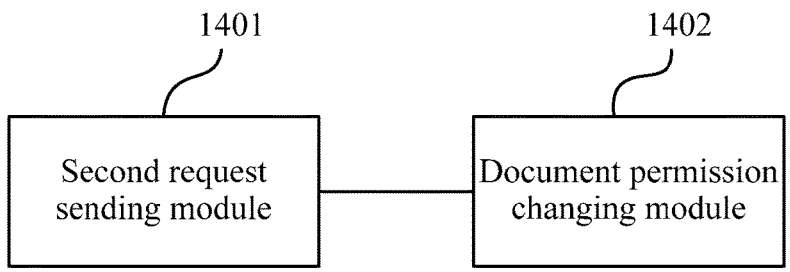
FIG. 14 is a block diagram of another document permission processing apparatus according to an embodiment of the present disclosure.

FIG. 14 is a block diagram of a document permission processing apparatus according to an embodiment of the present disclosure. The apparatus may be implemented by software and/or hardware and may be configured in an electronic device. For example, the apparatus may be configured in a mobile phone, a tablet computer, a computer device, or a server and may process a document permission by performing the document permission processing method. As shown in FIG. 14, the document permission processing apparatus provided in this embodiment may include a second request sending module 1401 and a document permission changing module 1402.

The second request sending module 1401 is configured to, in response to a second permission application operation of a first user on a first target document, send a third permission request to a second user, where the first user has a first permission for the first target document, the second user has a second permission for the first target document, and the first target document is provided with a first document permission.

The document permission changing module 1402 is configured to, in response to a third feedback instruction of the second user for the third permission request, change the first document permission of the first target document to a second document permission.

In the document permission processing apparatus provided in this embodiment, the second request sending module is configured to, in response to the second permission application operation of the first user on the first target document, send the third permission request to the second user, where the first user has the first permission for the first target document, the second user has the second permission for the first target document, and the first target document is provided with the first document permission; and the document permission changing module is configured to, in response to the third feedback instruction of the second user for the third permission request, change the first document permission of the first target document to the second document permission. In this embodiment, the preceding technical solutions are adopted, and the user without permission to change the document permission of the document may apply to the user having permission to change the document permission of the document for a certain document permission of the document so that after the document is shared with other users, the other users can access the document, the blocking during the document sharing or editing process due to the other users without permission to access the document after sharing can be avoided, and the user experience is improved.

The document permission processing apparatus provided in this embodiment further includes a second user permission changing module configured to, after the first document permission of the first target document is changed to the second document permission, in response to a second sharing operation of the first user on a link to the first target document, change a permission of a fifth user who acquires the link to the first target document for the first target document from a fifth permission to a sixth permission, where the fifth permission corresponds to the first document permission, and the sixth permission corresponds to the second document permission. The document permission processing apparatus provided in this embodiment further includes a second control display module configured to, in response to a control display request of the first user for the first target document, if permission information of the first user does not satisfy a second preset condition, display a third permission application control for the first user to execute the second permission application operation.

The second control display module is configured to, in response to the control display request of the first user for the first target document, if the permission information of the first user does not satisfy the second preset condition, display a second application window entry and in response to a trigger operation of the first user on the second application window entry, display a third permission application window and display the third permission application control in the third permission application window.

The document permission processing apparatus provided in this embodiment further includes a second permission determination module configured to, in response to a second permission selection operation of the first user in the third permission application window, determine a document permission selected by the first user as the second document permission.

The second request sending module 1401 is configured to, in response to the second permission application operation of the first user on the first target document, send a third instant messaging message corresponding to the third permission request to the second user through a first instant messaging client associated with the first target document.

The document permission processing apparatus provided in this embodiment further includes a second feedback module configured to, in response to a second feedback request sent by a second instant messaging client associated with a second target document, generate a fourth feedback instruction to change a document permission of the second target document, where the second feedback request is generated based on a feedback operation of the first user on a fourth instant messaging message in the second instant messaging client, and the fourth instant messaging message corresponds to a fourth permission request for the second target document.

The document permission processing apparatus provided in the embodiment of the present disclosure can perform the document permission processing method provided in any embodiment of the present disclosure and has functional modules and beneficial effects corresponding to the executed document permission processing method. For technical details not described in detail in this embodiment, reference may be made to the document permission processing method provided in any embodiment of the present disclosure.

Figure 15:
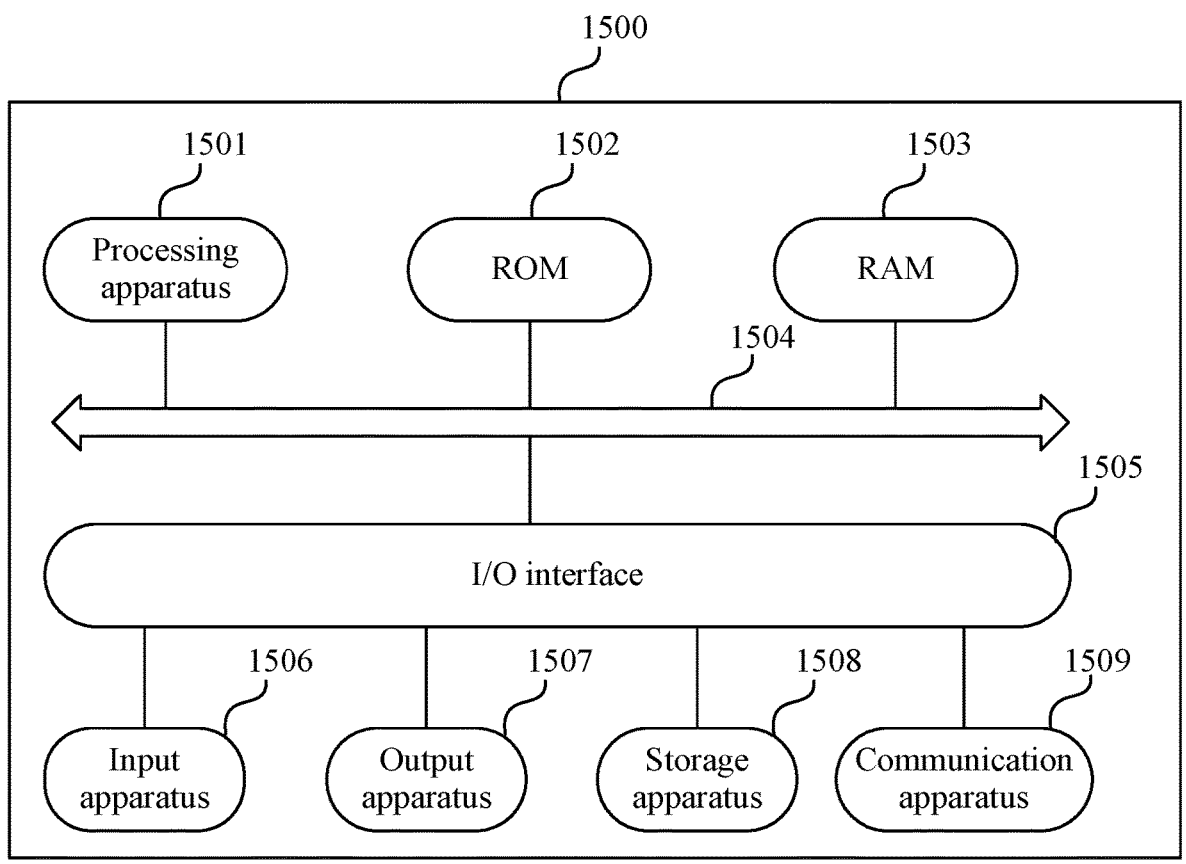
FIG. 15 is a structural diagram of an electronic device according to an embodiment of the present disclosure.

FIG. 15 is a structural diagram of an electronic device (for example, a terminal device) 1500 for implementing the embodiments of the present disclosure. The terminal device in the embodiment of the present disclosure may include, but is not limited to, a mobile terminal such as a mobile phone, a laptop, a digital broadcast receiver, a personal digital assistant (PDA), a PAD, a portable media player (PMP), or an in-vehicle terminal (such as an in-vehicle navigation terminal) and a stationary terminal such as a digital television (TV) or a desktop computer. The electronic device shown in FIG. 15 is merely an example and is not intended to limit the function and usage scope of the embodiments of the present disclosure.

As shown in FIG. 15, the electronic device 1500 may include a processing apparatus 1501 (such as a central processing unit or a graphics processing unit). The processing apparatus 1501 may perform various types of appropriate operations and processing according to a program stored in a read-only memory (ROM) 1502 or a program loaded from a storage apparatus 1506 to a random-access memory (RAM) 1503. The RAM 1503 also stores various programs and data required for the operation of the electronic device 1500. The processing apparatus 1501, the ROM 1502, and the RAM 1503 are connected to each other through a bus 1504. An input/output (I/O) interface 1505 is also connected to the bus 1504.

Generally, the following apparatus may be connected to the I/O interface 1505: an input apparatus 1506 such as a touch screen, a touch pad, a keyboard, a mouse, a camera, a microphone, an accelerometer, or a gyroscope; an output apparatus 1507 such as a liquid crystal display (LCD), a speaker, or a vibrator; the storage apparatus 1506 such as a magnetic tape or a hard disk, and a communication apparatus 1509. The communication apparatus 1509 may allow the electronic device 1500 to perform wireless or wired communication with other devices to exchange data. Although FIG. 15 shows the electronic device 1500 having various apparatuses, it is to be understood that not all the apparatuses shown herein need to be implemented or present. Alternatively, more or fewer apparatuses may be implemented or present.

Particularly, according to the embodiments of the present disclosure, the processes described above with reference to the flowcharts may be implemented as computer software programs. For example, a computer program product is included in the embodiments of the present disclosure and includes a computer program carried on a non-transitory computer-readable medium. The computer program includes program codes for performing the methods shown in the flowcharts. In such an embodiment, the computer program may be downloaded from a network and installed through the communication apparatus 1509, or may be installed from the storage apparatus 1506, or may be installed from the ROM 1502. When the computer program is executed by the processing apparatus 1501, the preceding functions defined in the methods of the embodiments of the present disclosure are implemented.

It is to be noted that the preceding computer-readable medium in the present disclosure may be a computer-readable signal medium or a computer-readable storage medium or any combination thereof. For example, the computer-readable storage medium may be, but is not limited to, an electrical, magnetic, optical, electromagnetic, infrared, or semiconductor system, apparatus, or device or any combination thereof. Concrete examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM) or a flash memory, an optical fiber, a portable compact disk read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as part of a carrier, where computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium except the computer-readable storage medium. The computer-readable signal medium may send, propagate, or transmit a program used by or used in conjunction with the instruction execution system, apparatus, or device. The program codes included on the computer-readable medium may be transmitted via any appropriate medium which includes, but is not limited to, a wire, an optical cable, a radio frequency (RF), or any appropriate combination thereof. In some embodiments, clients and servers may communicate using any currently known or future developed network protocol, such as the HyperText Transfer Protocol (HTTP) and may be interconnected with any form or medium of digital data communication (such as a communication network). Examples of the communication network include a local area network (LAN), a wide area network (WAN), an internet (such as the Internet), and a peer-to-peer network (such as an ad hoc network), as well as any currently known or future developed network.

The preceding computer-readable medium may be included in the preceding electronic device or may exist alone without being assembled into the electronic device.

The computer-readable medium carries one or more programs. When the one or more programs are executed by the electronic device, the electronic device performs the following process: in response to a first permission application operation of a first user on a first target document, sending a first permission request to a second user, where the first user has a first permission for the first target document, the second user has a second permission for the first target document, the first permission request carries an identifier of a third user, and the third user has a third permission for the first target document; and in response to a first feedback instruction of the second user for the first permission request, changing the third permission of the third user to a fourth permission. Alternatively, in response to a second permission application operation of a first user on a first target document, a third permission request is sent to a second user, where the first user has a first permission for the first target document, the second user has a second permission for the first target document, and the first target document is provided with a first document permission; and in response to a third feedback instruction of the second user for the third permission request, the first document permission of the first target document is changed to a second document permission.

Computer program codes for performing the operations in the present disclosure may be written in one or more programming languages or a combination thereof. The preceding one or more programming languages include, but are not limited to, object-oriented programming languages such as Java, Smalltalk, and C++, as well as conventional procedural programming languages such as C or similar programming languages. The program codes may be executed entirely on a user computer, executed partly on a user computer, executed as a stand-alone software package, executed partly on a user computer and partly on a remote computer, or executed entirely on a remote computer or a server. In the case related to the remote computer, the remote computer may be connected to the user computer via any kind of network including a local area network (LAN) or a wide area network (WAN) or may be connected to an external computer (for example, via the Internet through an Internet service provider).

The flowcharts and block diagrams in the drawings show possible architectures, functions, and operations of the system, method, and computer program product according to multiple embodiments of the present disclosure. In this regard, each block in the flowcharts or block diagrams may represent a module, a program segment, or part of codes containing one or more executable instructions for implementing specified logical functions. It is also to be noted that in some alternative implementations, the functions marked in the blocks may occur in an order different from those marked in the drawings. For example, two successive blocks may, in fact, be executed basically in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. The name of a module is not intended to limit the unit itself in a certain circumstance. The functions described above herein may be implemented at least partially by one or more hardware logic components. For example, without limitations, example types of hardware logic components that may be used include a field-programmable gate array (FPGA), an application-specific integrated circuit (ASIC), an application-specific standard product (ASSP), a system on a chip (SoC), a complex programmable logic device (CPLD), and the like.

In the context of the present disclosure, the machine-readable medium may be a tangible medium that may include or store the program used by or used in conjunction with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device or any appropriate combination thereof. Concrete examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

According to one or more embodiments of the present disclosure, example one provides a document permission processing method. The method includes the steps described below.

In response to a first permission application operation of a first user on a first target document, a first permission request is sent to a second user, where the first user has a first permission for the first target document, the second user has a second permission for the first target document, the first permission request carries an identifier of a third user, and the third user has a third permission for the first target document.

In response to a first feedback instruction of the second user for the first permission request, the third permission of the third user is changed to a fourth permission.

According to one or more embodiments of the present disclosure, in example two based on example one, the method further includes the step described below.

In response to a first collaboration request in which the first user adds the third user for the first target document, if permission information of the first user does not satisfy a first preset condition, a permission application control is displayed for the first user to execute the first permission application operation.

According to one or more embodiments of the present disclosure, in example three based on example two, the method further includes the step described below.

In response to an addition operation of the first user adding the third user through a sharing control of the first target document, the first collaboration request is generated.

The step of displaying the permission application control includes the step described below.

The sharing control is switched to a first permission application window of the first target document and a first permission application control is displayed in the first permission application window.

According to one or more embodiments of the present disclosure, in example four based on example second, the method further includes the step described below.

In response to a first sharing operation of the first user on the first target document in a conversation interface, the first collaboration request to add the third user for the first target document is generated.

The step of displaying the permission application control includes the steps described below.

A first application window entry is displayed in the conversation interface.

In response to a trigger operation of the first user on the first application window entry, a second permission application window is displayed and a second permission application control is displayed in the second permission application window.

According to one or more embodiments of the present disclosure, in example five based on example three or four, the method further includes the step described below.

In response to a first permission selection operation of the first user in a permission application window, a permission selected by the first user is determined as the fourth permission, where the permission application window includes the first permission application window and/or the second permission application window.

According to one or more embodiments of the present disclosure, in the method in example six based on any one of examples one to four, the step of sending the first permission request to the second user includes the step described below.

A first instant messaging message corresponding to the first permission request is sent to the second user through a first instant messaging client associated with the first target document.

According to one or more embodiments of the present disclosure, in example seven based on example six, the method further includes the step described below.

In response to a first feedback request sent by a second instant messaging client associated with a second target document, a second feedback instruction is generated so as to change a permission of a fourth user for the second target document, where the first feedback request is generated based on a feedback operation of the first user on a second instant messaging message in the second instant messaging client, the second instant messaging message corresponds to a second permission request for the second target document, and the second permission request carries an identifier of the fourth user.

According to one or more embodiments of the present disclosure, example eight provides a document permission processing method. The method includes the steps described below.

In response to a second permission application operation of a first user on a first target document, a third permission request is sent to a second user, where the first user has a first permission for the first target document, the second user has a second permission for the first target document, and the first target document is provided with a first document permission.

In response to a third feedback instruction of the second user for the third permission request, the first document permission of the first target document is changed to a second document permission.

According to one or more embodiments of the present disclosure, in example nine based on example eight, after the first document permission of the first target document is changed to the second document permission, the method further includes the step described below.

In response to a second sharing operation of the first user on a link to the first target document, a permission of a fifth user who acquires the link to the first target document for the first target document is changed from a fifth permission to a sixth permission, where the fifth permission corresponds to the first document permission, and the sixth permission corresponds to the second document permission.

According to one or more embodiments of the present disclosure, in example ten based on example eight, the method further includes the step described below.

In response to a control display request of the first user for the first target document, if permission information of the first user does not satisfy a second preset condition, a third permission application control is displayed for the first user to execute the second permission application operation.

According to one or more embodiments of the present disclosure, in the method in example eleven based on example ten, the step of displaying the third permission application control includes the steps described below.

A second application window entry is displayed.

In response to a trigger operation of the first user on the second application window entry, a third permission application window is displayed and the third permission application control is displayed in the third permission application window.

According to one or more embodiments of the present disclosure, in example twelve based on example eleven, the method further includes the step described below.

In response to a second permission selection operation of the first user in the third permission application window, a document permission selected by the first user is determined as the second document permission.

According to one or more embodiments of the present disclosure, in the method in example thirteen based on any one of examples eight to twelve, the step of sending the third permission request to the second user includes the step described below.

A third instant messaging message corresponding to the third permission request is sent to the second user through a first instant messaging client associated with the first target document.

According to one or more embodiments of the present disclosure, in example fourteen based on example thirteen, the method further includes the step described below.

In response to a second feedback request sent by a second instant messaging client associated with a second target document, a fourth feedback instruction is generated so as to change a document permission of the second target document, where the second feedback request is generated based on a feedback operation of the first user on a fourth instant messaging message in the second instant messaging client, and the fourth instant messaging message corresponds to a fourth permission request for the second target document.

According to one or more embodiments of the present disclosure, example fifteen provides a document permission processing apparatus. The apparatus includes a first request sending module and a first user permission changing module.

The first request sending module is configured to, in response to a first permission application operation of a first user on a first target document, send a first permission request to a second user, where the first user has a first permission for the first target document, the second user has a second permission for the first target document, the first permission request carries an identifier of a third user, and the third user has a third permission for the first target document.

The first user permission changing module is configured to, in response to a first feedback instruction of the second user for the first permission request, change the third permission of the third user to a fourth permission.

According to one or more embodiments of the present disclosure, example sixteen provides a document permission processing apparatus. The apparatus includes a second request sending module and a document permission changing module.

The second request sending module is configured to, in response to a second permission application operation of a first user on a first target document, send a third permission request to a second user, where the first user has a first permission for the first target document, the second user has a second permission for the first target document, and the first target document is provided with a first document permission.

The document permission changing module is configured to, in response to a third feedback instruction of the second user for the third permission request, change the first document permission of the first target document to a second document permission.

According to one or more embodiments of the present disclosure, example seventeen provides an electronic device. The electronic device includes one or more processors and a memory configured to store one or more programs.

When executed by the one or more processors, the one or more programs cause the one or more processors to perform the document permission processing method according to any one of examples one to fourteen.

According to one or more embodiments of the present disclosure, example eighteen provides a computer-readable storage medium configured to store a computer program for performing the document permission processing method according to any one of examples one to fourteen when the program is executed by a processor.

The preceding description is merely illustrative of example embodiments of the present disclosure and the technical principles used therein. It is to be understood by those skilled in the art that the scope of disclosure involved in the present disclosure is not limited to the technical solutions formed by particular combinations of the preceding technical features and should also cover other technical solutions formed by any combinations of the preceding technical features or their equivalents without departing from the concept of the present disclosure, for example, technical solutions formed by the substitutions of the preceding features with the technical features (not limited to being) disclosed in the present disclosure and having similar functions.

In addition, although the operations are depicted in a particular order, this should not be construed as requiring that such operations should be performed in the particular order shown or in a sequential order. In a certain environment, multitasking and parallel processing may be advantageous. Similarly, although several specific implementation details are included in the preceding discussion, these should not be construed as limiting the scope of the present disclosure.

Some features described in the context of separate embodiments may also be implemented in combination in a single embodiment. Rather, features described in the context of a single embodiment may be implemented in multiple embodiments individually or in any suitable subcombination.

What is claimed is:

1. A document permission processing method, comprising:
in response to a first permission application operation of a first user on a first target document for applying permission for the first target document for a third user, sending, by an electronic device at the first user side, a first permission request to a second user, wherein the first user has a first permission for the first target document, the second user has a second permission for the first target document, and the first permission request is a request in which the first user applies for an access permission to the first target document for one or more third users and carries an identifier of the third user; and
in response to a first feedback instruction of the second user for the first permission request, changing a third permission of the third user to a fourth permission,
wherein the first permission comprises the access permission of the first target document, the second permission is a permission that grants a permission to other users, and the fourth permission is the access permission,
wherein the first user is a user having permission to access the first target document, the second user is a user having permission to grant other users access to the first target document, and the third user is a user without the access permission to the first target document,
and
wherein the third user acquires the fourth permission through the first permission request sent to the second user.

2. The method of claim 1, further comprising:
in response to a first collaboration request in which the first user adds the third user for the first target document and permission information of the first user not satisfying a first preset condition, displaying a permission application control for the first user to execute the first permission application operation.

3. The method of claim 2, further comprising:
in response to an addition operation of the first user adding the third user through a sharing control of the first target document, generating the first collaboration request;
wherein displaying the permission application control comprises:
switching the sharing control to a first permission application window of the first target document and displaying a first permission application control in the first permission application window.

4. The method of claim 3, further comprising:
in response to a first permission selection operation of the first user in a permission application window, determining a permission selected by the first user as the fourth permission, wherein the permission application window comprises at least one of the following: the first permission application window or the second permission application window.

5. The method of claim 2, further comprising:
in response to a first sharing operation of the first user on the first target document in a conversation interface, generating the first collaboration request to add the third user for the first target document;
wherein displaying the permission application control comprises:
displaying a first application window entry in the conversation interface; and
in response to a trigger operation of the first user on the first application window entry, displaying a second permission application window and displaying a second permission application control in the second permission application window.

6. The method of claim 1, wherein sending the first permission request to the second user comprises:
sending a first instant messaging message corresponding to the first permission request to the second user through a first instant messaging client associated with the first target document.

7. The method of claim 6, further comprising:
in response to a first feedback request sent by a second instant messaging client associated with a second target document, generating a second feedback instruction to change a permission of a fourth user for the second target document, wherein the first feedback request is generated based on a feedback operation of the first user on a second instant messaging message in the second instant messaging client, the second instant messaging message corresponds to a second permission request for the second target document, and the second permission request carries an identifier of the fourth user.

8. A document permission processing method, comprising:
in response to a second permission application operation of a first user on a first target document for modifying a document permission of the first target document, sending a third permission request to a second user, wherein the first user has a first permission for the first target document and does not have a permission to modify the document permission of the first target document, the second user has a second permission for the first target document, and a first document permission is configured for the first target document; and
in response to a third feedback instruction of the second user for the third permission request, changing the first document permission of the first target document to a second document permission,
wherein the third permission request is a request by the first user to apply for a document permission for the first target document, and the second document permission is the document permission requested by the first user,
wherein the first permission comprises an access permission of the first target document, the second permission is a permission that grants a permission to other users, the first document permission comprises a sharing permission of the first target document, and the second document permission is a link access permission, and wherein the first user is a user without the second document permission of the first target document, the second document permission of the first target document is disabled before the third feedback instruction is received, and the second document permission of the first target document is enabled after the third feedback instruction is received.

9. The method of claim 8, after the first document permission of the first target document is changed to the second document permission, the method further comprises:
in response to a second sharing operation of the first user on a link to the first target document, changing a permission of a fifth user who acquires the link to the first target document for the first target document from a fifth permission to a sixth permission, wherein the fifth permission corresponds to the first document permission, and the sixth permission corresponds to the second document permission.

10. The method of claim 8, further comprising:
in response to a control display request of the first user for the first target document and permission information of the first user not satisfying a second preset condition, displaying a third permission application control for the first user to execute the second permission application operation.

11. The method of claim 10, wherein displaying the third permission application control comprises:
displaying a second application window entry; and
in response to a trigger operation of the first user on the second application window entry, displaying a third permission application window and displaying the third permission application control in the third permission application window.

12. The method of claim 11, further comprising:
in response to a second permission selection operation of the first user in the third permission application window, determining a document permission selected by the first user as the second document permission.

13. The method of claim 8, wherein sending the third permission request to the second user comprises:
sending a third instant messaging message corresponding to the third permission request to the second user through a first instant messaging client associated with the first target document.

14. The method of claim 13, further comprising:
in response to a second feedback request sent by a second instant messaging client associated with a second target document, generating a fourth feedback instruction to change a document permission of the second target document, wherein the second feedback request is generated based on a feedback operation of the first user on a fourth instant messaging message in the second instant messaging client, and the fourth instant messaging message corresponds to a fourth permission request for the second target document.

15. An electronic device, comprising:
at least one processor; and
a memory, which is configured to store at least one program;
wherein when executed by the at least one processor, the at least one program causes the at least one processor to perform a document permission processing method, wherein the document permission processing method comprises:
in response to a first permission application operation of a first user on a first target document for applying permission for the first target document for a third user, sending, by an electronic device at the first user side, a first permission request to a second user, wherein the first user has a first permission for the first target document, the second user has a second permission for the first target document, and the first permission request is a request in which the first user applies for an access permission to the first target document for one or more third users and the first permission request carries an identifier of the third user; and
in response to a first feedback instruction of the second user for the first permission request, changing a third permission of the third user to a fourth permission,
wherein the first permission comprises the access permission of the first target document, the second permission is a permission that grants a permission to other users, and the fourth permission is the access permission,
wherein the first user is a user having permission to access the first target document, the second user is a user having permission to grant other users access to the first target document, and the third user is a user without the access permission to the first target document,
and
wherein the third user acquires the fourth permission through the first permission request sent to the second user.

16. A non-transitory computer-readable storage medium, which is configured to store a computer program for performing the document permission processing method of claim 1 when the computer program is executed by a processor.

17. The electronic device of claim 15, further comprising:
in response to a first collaboration request in which the first user adds the third user for the first target document and permission information of the first user not satisfying a first preset condition, displaying a permission application control for the first user to execute the first permission application operation.

18. The electronic device of claim 17, further comprising:
in response to an addition operation of the first user adding the third user through a sharing control of the first target document, generating the first collaboration request;
wherein displaying the permission application control comprises:
switching the sharing control to a first permission application window of the first target document and displaying a first permission application control in the first permission application window.

* * * * *